(12) United States Patent
John et al.

(10) Patent No.: US 10,876,495 B2
(45) Date of Patent: Dec. 29, 2020

(54) PISTON DESIGN FOR SPLITTING JETS INTO STREAMS

(71) Applicant: Caterpillar Inc., Deerfield, IL (US)

(72) Inventors: Bobby John, Peoria, IL (US); Jonathan W. Anders, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 54 days.

(21) Appl. No.: 16/158,052

(22) Filed: Oct. 11, 2018

(65) Prior Publication Data

US 2020/0116103 A1     Apr. 16, 2020

(51) Int. Cl.
*F02F 3/28*     (2006.01)
*F02F 3/26*     (2006.01)

(52) U.S. Cl.
CPC . *F02F 3/28* (2013.01); *F02F 3/26* (2013.01)

(58) Field of Classification Search
CPC ..................................... F02F 3/28; F02F 3/26
USPC ........................................................ 123/307
See application file for complete search history.

(56) References Cited

U.S. PATENT DOCUMENTS

| 6,729,290 B1* | 5/2004 | Rorke ..................... F01L 11/02 123/193.6 |
| 8,677,974 B2 | 3/2014 | Rothbauer et al. |
| 9,267,422 B2 | 2/2016 | Straub |
| 9,732,665 B2 | 8/2017 | Ono |
| 9,869,270 B1 | 1/2018 | Anders et al. |
| 9,995,203 B2 | 6/2018 | John et al. |
| 2014/0238341 A1* | 8/2014 | Straub ................. F02B 23/0624 123/301 |
| 2015/0068490 A1* | 3/2015 | de Ojeda ................ F02D 19/10 123/27 R |
| 2017/0067391 A1* | 3/2017 | Brandt ................ F02B 23/0687 |
| 2018/0119637 A1 | 5/2018 | John et al. |

FOREIGN PATENT DOCUMENTS

EP          0828066 B1     1/2002

* cited by examiner

*Primary Examiner* — Joseph J Dallo
*Assistant Examiner* — Yi-Kai Wang
(74) *Attorney, Agent, or Firm* — Brannon Sowers & Cracraft

(57) ABSTRACT

A component of a piston may include a crown portion configured to face a flame deck surface disposed at one end of a cylinder bore in which the piston is configured to reciprocate, such that a combustion chamber is defined within the cylinder bore and between a top surface of the crown portion and the flame deck surface. The component may include an indent formed in the top surface. The indent may be aligned with a fuel jet centerline along which a fuel jet is to be injected into the combustion chamber. The indent may include a first arcuate indent portion, that curves in a first direction from a center of the crown portion, and a second arcuate indent portion that curves in a second direction from a break in a reentrant feature that overhangs the first arcuate indent portion. The component may be included in an internal combustion engine.

21 Claims, 4 Drawing Sheets

PISTON DESIGN FOR SPLITTING JETS INTO STREAMS

TECHNICAL FIELD

The present disclosure relates generally to internal combustion engines and, more particularly, to combustion chamber features for direct injection engines.

BACKGROUND

Most modern engines are direct injection engines, which means that each combustion cylinder of the engine includes a dedicated fuel injector configured to inject fuel directly into a combustion chamber. While direct injection engines represent an improvement in engine technology over past designs in the form of increased engine efficiency and reduced emissions, the improvement of the design of any particular engine is always desirable, especially in light of increasing fuel costs and ever more strict regulations on engine emissions.

In a traditional direct injection engine, one or more fuel jets that are injected into a combustion chamber interact with various combustion chamber structures, which cause the fuel to disperse into the combustion chamber. More specifically, the fuel jet(s) entering the combustion chamber impact various surfaces of the combustion chamber, such as a piston bowl, the flame deck surface of the cylinder head, the cylinder liner or bore, and other surfaces before spreading in all directions. The impingement of the fuel jets with these structures may have a variety of effects, including increased emissions, because localized areas having higher fuel concentrations may burn rich while other areas on the cylinder may burn lean. This can further result in higher temperatures, decreased fuel efficiency, increased heat rejection and component temperatures, and/or the like.

Various solutions have been proposed for improving an engine's efficiency and reducing the engine's emissions. One example can be seen in U.S. Pat. No. 9,091,199 ("Straub"), which was granted on Jul. 28, 2015. Straub describes a combustion chamber that includes a piston forming deflection foils. The deflection foils operate to distribute a fuel spray into portions directed toward one of the deflection foils, which redirect their respective portion of the fuel spray into a combined radial path that swirls about a center of the combustion chamber. In the described implementation, Straub explains that the fuel spray is thus directed substantially tangential relative to the combined radial path of the redirected portions of the fuel spray. While the flow redirection of Straub may be partially effective in improving mixing of air with incoming fuel in the combustion chamber, the momentum of the redirected fuel spray is maintained generally parallel to a top piston surface, such that the induced swirling may cause fuel to migrate towards a cylinder wall. Maintaining the fuel close to the piston may also increase heat rejection while the fuel is burning.

The piston design of the present disclosure solves one or more of the problems set forth above and/or other problems in the art.

SUMMARY

According to some implementations, the present disclosure is related to an internal combustion engine. The internal combustion engine may include an engine block having at least one cylinder bore, a cylinder head having a flame deck surface disposed at one end of the cylinder bore, and a piston connected to a rotatable crankshaft and configured to reciprocate within the cylinder bore. The piston may have a crown portion facing the flame deck surface such that a combustion chamber is defined within the cylinder bore and between a top surface of the crown portion and the flame deck surface. The internal combustion engine may include a fuel injector having a nozzle tip disposed in fluid communication with the combustion chamber. The nozzle tip may have at least one nozzle opening configured to inject a fuel jet into the combustion chamber. An indent may be formed in the top surface. The indent may include a first arcuate indent portion that curves in a first spiral direction extending from a central portion of the piston and a second arcuate indent portion that curves in a second spiral direction extending from a break in a wall of the first arcuate indent portion.

According to some implementations, the present disclosure is related to a component of a piston. The component may include a crown portion configured to face a flame deck surface disposed at one end of a cylinder bore in which the piston is configured to reciprocate, such that a combustion chamber is defined within the cylinder bore and between a top surface of the crown portion and the flame deck surface. The component may include an indent formed in the top surface. The indent may be aligned with a fuel jet centerline along which a fuel jet is to be injected into the combustion chamber. The indent may include a first arcuate indent portion, that curves in a first direction from a center of the crown portion, and a second arcuate indent portion that curves in a second direction from a break in a reentrant feature that overhangs the first arcuate indent portion.

According to some implementations, the present disclosure is related to a method for distributing fuel in a combustion chamber. The method may include injecting a fuel jet into the combustion chamber such that the fuel jet impinges upon a structure in the combustion chamber. The method may include splitting the fuel jet into a first fuel jet portion, that follows a first path along a first arcuate indent portion of an indent formed in the structure, and a second fuel jet portion that follows a second path along a second arcuate indent portion of the indent. The first arcuate indent portion may curve in a first direction extending from a portion of the structure upon which the fuel jet impinges upon injection into the combustion chamber. The second arcuate indent portion may curve in a second direction extending from a portion of the first arcuate indent portion.

DETAILED DESCRIPTION

This disclosure relates to internal combustion engines and, more particularly, to features incorporated within at least one combustion chamber of the engine to contain and redirect fuel jets or streams of liquid and/or gaseous fuel provided by separate fuel injector nozzle openings. The fuel jets are redirected and also segregated during a majority of the injection time to promote better fuel/air mixing and a more uniform fuel/air mixture within the combustion chamber as compared to previously proposed or known combustion systems. The various examples described herein include structures and features that operate or result in redirecting fuel jets circumferentially with respect to the cylinder bore of an engine to avoid, minimize, or delay interaction between adjacent fuel jets entering the combustion chamber. The design features redirect each fuel jet separately to create a spiral motion within the combustion chamber independently from any swirl generated from the use of valve inserts or port design changes. In the described implementations, this is accomplished at least in part by directing an impact or impingement of one or more jets of combusting fuel towards an interior of the combustion chamber and away from the cylinder head, the valves, and the cylinder liner. The combustion and heat release are, in this fashion, kept away from surfaces and insulated within the combustion chamber by the surrounding fluids within the combustion chamber, which in turn leads to lower component temperatures, increased fuel efficiency, and a more uniform fuel/air mixture, which also leads to lower engine emissions.

Figure 1:
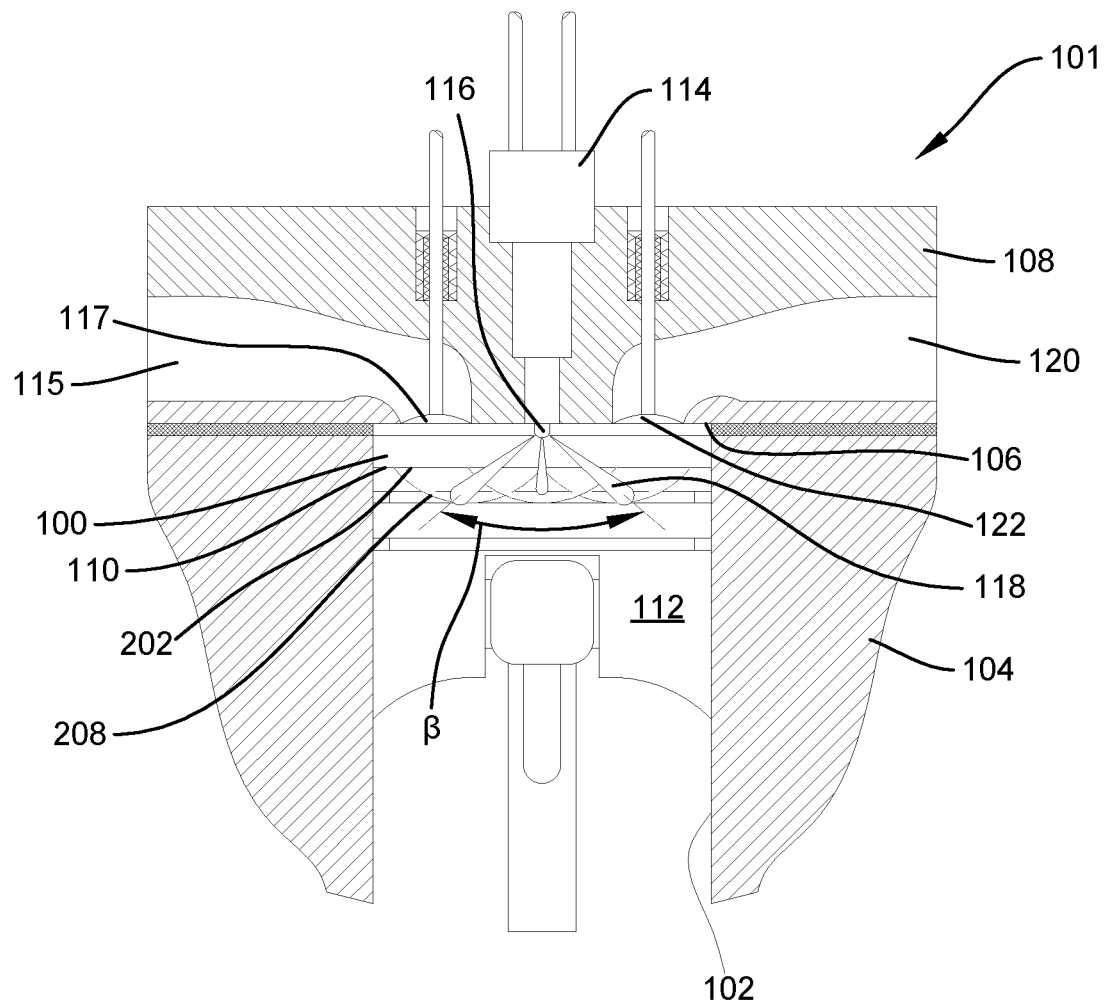
FIG. 1 is a diagram of a cross section of an example combustion chamber of an engine.

FIG. 1 is a diagram of a cross section of an example combustion chamber 100 of an engine 101. The combustion chamber 100 has a generally cylindrical shape that is defined within a cylinder bore 102 formed within a crankcase or engine block 104 of the engine 101. The combustion chamber 100 is further defined at one end by a flame deck surface 106 of a cylinder head 108, and at another end by a piston crown 110 of a piston 112 that is reciprocally disposed within the cylinder bore 102. A fuel injector 114 is mounted in the cylinder head 108. The fuel injector 114 has an injector tip 116 that protrudes within the combustion chamber 100 through the flame deck surface 106 such that the fuel injector 114 can directly inject fuel into the combustion chamber 100.

During operation of the engine 101, air is admitted into the combustion chamber 100 via an air inlet passage 115 when one or more intake valves 117 (one shown) are open during an intake stroke. High pressure fuel is permitted to flow through nozzle openings in the injector tip 116 to form fuel jets that enter the combustion chamber 100. Each nozzle opening creates a fuel jet 118 that generally disperses to create a predetermined fuel/air mixture, which in a compression ignition engine auto-ignites and combusts. The fuel jets 118 may be provided from the injector at an included angle, β, of between 110 degrees and 150 degrees as an example, but other angles may also be used. Following combustion, exhaust gas is expelled from the combustion chamber 100 through an exhaust conduit 120 when one or more exhaust valves 122 (one shown) is/are open during an exhaust stroke.

The uniformity and extent of fuel/air mixing in the combustion cylinder is relevant to the combustion efficiency, as well as to the amount and type of combustion byproducts that are formed. For example, fuel-rich mixtures, which may be locally present within the combustion chamber 100 during a combustion event due to insufficient mixing, may lead to higher soot emissions and lower combustion efficiency. In the illustrated implementations, more uniform fuel/air mixing is managed for each fuel jet 118 by forming a plurality of indents (e.g., symmetrically) around and into the crown surface of the piston 112. One or more of the indents may include a first arcuate indent portion that curves in a first direction and a second arcuate indent portion that curves in a second direction. For example, the first arcuate indent portion may curve in a clockwise direction, and the second arcuate indent portion may curve in a counter-clockwise direction. Alternatively, the first arcuate indent portion may curve in a counter-clockwise direction, and the second arcuate indent portion may curve in a clockwise direction. In some implementations, the first arcuate indent portion may be larger than the second arcuate indent portion.

Each indent serves to accept, contain, redirect and segregate therein one of a plurality of fuel streams originating from one of a plurality of nozzle openings in the fuel injector 114 from mixing with other fuel streams from the remaining nozzle openings, at least for a period, during an injection and/or fuel burning event in the combustion chamber 100 during operation. Each indent may present a cambered, pitched face on the top surface of the piston 112, which may lead into a concave feature formed or otherwise constructed into the top piston face.

Some features and structures shown in FIG. 1 are described in more detail below in connection with FIG. 2, such as a crown surface 202 and an indent 208. As indicated above, FIG. 1 is provided as an example. Other examples may differ from what was described in connection with FIG. 1.

Figure 2:
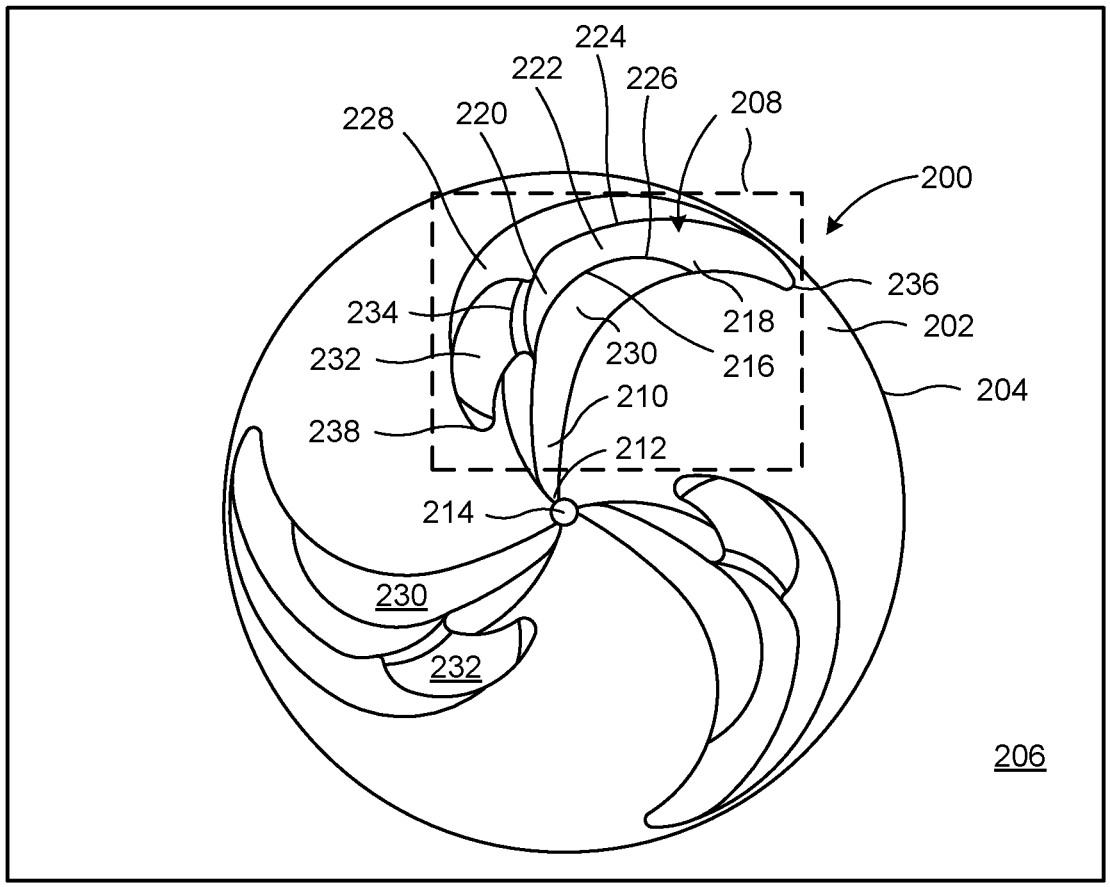
FIG. 2 is a diagram of a top view of an example piston of an engine.

FIG. 2 is a diagram of a top view of an example piston 112 of an engine 101. In FIG. 2, only a top surface 200 of the piston crown 110 of the piston 112 is shown for simplicity. The top surface 200 has a generally circular shape that encloses a crown surface 202. The top surface 200 is defined within a circular periphery 204 and has a generally flat shape that extends along a single plane 206 that is nominally disposed in perpendicular relation to a centerline axis of the cylinder bore 102 (shown in FIG. 1).

A plurality of indents 208 are included in the top surface 200. The indents 208 have a concave shape extending away from the plane 206 in a direction into the body of the piston 112 (i.e., in a downward direction in the orientation shown in FIG. 1). In FIG. 2, three indents 208 are shown, but fewer or more indents 208 can be used on any one particular piston 112. In use, it is contemplated that the number of indents 208 may be the same as the number of nozzle openings in the injector tip 116, such that each fuel jet 118 provided by the fuel injector 114 may correspond to one indent 208 on the piston crown 110 (e.g., the crown surface 202).

In some implementations, different indents 208 may have the same shape. In some implementations, different indents 208 may have different shapes. In the examples of FIG. 1 and FIG. 2, the fuel injector 114 (FIG. 1) includes three nozzle openings formed in the injector tip 116 such that three fuel jets 118 are produced during operation of the engine 101. As shown, all three indents 208 have the same shape to redirect the three fuel jets 118 provided by the fuel injector 114 in the same or a similar manner (e.g., a symmetrical pattern). When the piston 112 is reciprocally mounted in the cylinder bore 102 of the engine 101, the top surface 200 is oriented such that each of the fuel jets 118 is injected in a direction such that the fuel jet 118 enters into a respective indent 208 to be redirected thereby during engine operation.

Each indent 208 presents various flat, concave, or convex surfaces, which directly or indirectly redirect a respective fuel jet 118 into the indent 208 during operation. As an example, each indent 208 may include an entry surface 210, which may be flat, in some implementations. The entry surface 210 may lie along an angled plane that is disposed at an acute angle relative to the plane 206 of the piston crown 110. The entry surface 210 may have a generally triangular shape with curved edges that extend curvedly from an innermost point 212 of the entry surface 210 and/or the indent 208. The innermost point 212 may be disposed adjacent to a piston surface center 214. The entry surface 210 extends curvedly away from the piston surface center 214 in a radial direction along the angled plane to provide a cambered or pitched surface that, during operation, engages and contacts the respective fuel jet 118 to direct the fuel jet 118 along the angled plane and into the indent 208.

Opposite the innermost point 212 (e.g., toward the periphery 204), the entry surface 210 has a generally curved edge 216. The curved edge 216 may be sickle-shaped and/or may include a break or inflection, which forms a transition between the entry surface 210 and a recirculation surface 218. The recirculation surface 218, which may form a bottom-most portion of the indent 208, has a concave shape that sweeps in a spiral direction radially outwardly from the piston surface center 214 along the curved edge 216. A section of the recirculation surface 218 available for fuel jet redirection may be largest along a middle portion 220 of the recirculation surface 218, and a section of the recirculation surface 218 available for fuel jet redirection may decrease in both radial directions inwardly and outwardly from the middle portion with respect to the piston surface center 214.

Each indent 208 further includes a wall 222 extending generally parallel or at a slight angle relative to a piston crown centerline or symmetry axis. The wall 222 has a variable width or height that is minimum along the wall's radially inward and outward ends, and maximum along a middle portion thereof. The wall 222 presents a top edge 224 having a generally curved shape and a bottom edge 226 that follows an external edge of the recirculation surface 218. At an interface or rim of each indent 208 with respect to the crown surface 202 is disposed a reentrant feature 228. The reentrant feature 228 may extend over the wall 222 and/or a portion of the recirculation surface 218 (e.g., forming an overhang) to direct fuel that strikes the wall 222 away from the periphery 204 (e.g., and/or toward a central portion of the combustion chamber 100). A plurality of depressed surfaces that bow away from the plane 206 of the crown surface 202 may also be formed around the piston 112 such that the piston surface center 214 protrudes as a peak relative to the surrounding indents 208.

One or more of the indents 208 may include a first arcuate indent portion 230 that curves or spirals in a first direction (e.g., a first spiral direction, a first curved direction, and/or the like) and a second arcuate indent portion 232 that curves or spirals in a second direction (e.g., a second spiral or curved direction opposite the first spiral or curved direction). For example, the first arcuate indent portion 230 may curve in a clockwise direction, and the second arcuate indent portion 232 may curve in a counter-clockwise direction. Alternatively, the first arcuate indent portion 230 may curve in a counter-clockwise direction, and the second arcuate indent portion 232 may curve in a clockwise direction.

In some implementations, the first arcuate indent portion 230 may be larger than the second arcuate indent portion 232. For example, the maximum width of the first arcuate indent portion 230 may be wider than the maximum width of the second arcuate indent portion 232. Additionally, or alternatively, the length (e.g., a Euclidean distance, a radial length, and/or the like) of the first arcuate indent portion 230 (e.g., from the innermost point 212 to an outer tip 236 of the first arcuate indent portion 230) may be longer than the length of the second arcuate indent portion 232 (e.g., from a break 234 to a tip 238 of the second arcuate indent portion 232). Additionally, or alternatively, the maximum depth of the first arcuate indent portion 230 may be deeper than the maximum depth of the second arcuate indent portion 232.

Additionally, or alternatively, the exit angle of the second arcuate indent portion 232 may be different from (e.g., shallower than) the exit angle of the first arcuate indent portion 230. Additionally, or alternatively, the bend radius of the second arcuate indent portion 232 may be different from (e.g., sharper than) the bend radius of the first arcuate indent portion 230.

The second arcuate indent portion 232 may be disposed along and/or may extend from the wall 222, such that a break 234 in the wall 222 permits a first portion of the fuel jet 118 (e.g., a first fuel jet portion) to flow into the second arcuate indent portion 232, while a second portion of the fuel jet 118 (e.g., a second fuel jet portion) continues past the break 234 and flow through the first arcuate indent portion 230. Thus, the second arcuate indent portion 232 may extend from the break 234 in the wall 222 in a second direction. This may assist with quickly achieving more even fuel dispersion within the combustion chamber 100. Additionally, or alternatively, the second arcuate indent portion 232 may form and/or extend from a break in the reentrant feature 228.

Although a single second arcuate indent portion 232 is shown for each indent 208, in some implementations, an indent 208 may have multiple second arcuate indent portions 232 disposed at different positions along the wall 222 of the recirculation surface 218. In this way, fuel injected into the combustion chamber 100 may follow multiple paths along the indent 208 (e.g., along the first arcuate indent portion and one or more second arcuate indent portions) to achieve quick dispersion throughout the combustion chamber 100, which may provide better combustion, reduced fuel emissions, and/or the like.

As indicated above, FIG. 2 is provided as an example. Other examples may differ from what was described in connection with FIG. 2.

Figure 3:
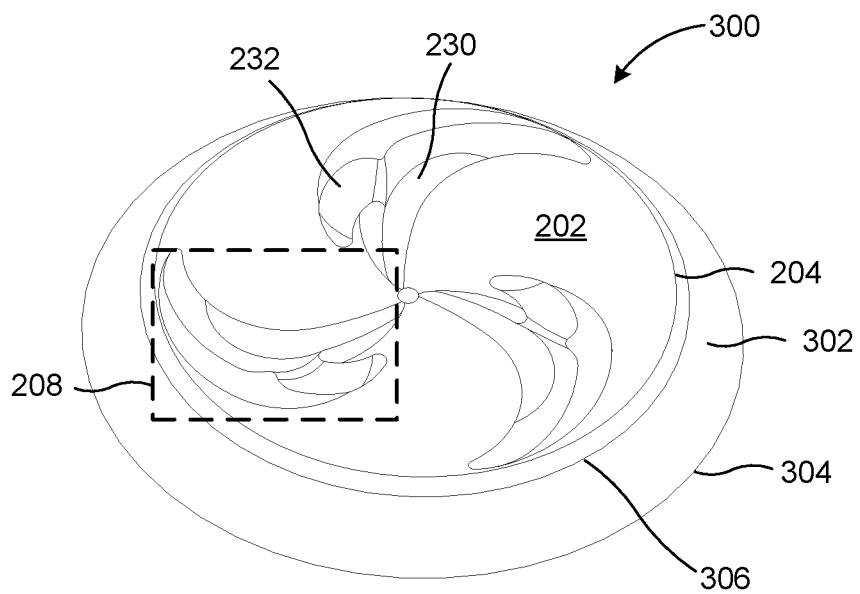
FIG. 3 is a diagram of a perspective view of an example top surface of a piston.

FIG. 3 is a diagram of a perspective view of an example top surface 300 of a piston 112. The same or similar features and structures as the top surface 200 of FIG. 2 are denoted by the same reference numerals previously used for simplicity. The top surface 300, similar to the top surface 200, includes an arrangement of three arcuate indents 208. The top surface 300 further includes a sloping or frustoconical outer surface 302 (e.g., creating a slope in the outer surface 302), which creates an empty space around a top, outer periphery of the piston. The outer surface 302 opens up the squish region or squish area of the piston 112, which is the region along the outer peripheral cylindrical surface of the piston 112 that is disposed above the upper seal ring of the piston 112 and occupies the cylindrical space between the piston 112 and the inner surface of the cylinder bore 102. In the illustrated implementation, the outer surface 302 extends at an acute angle (e.g., between 0 and 60 degrees, as an example) between a top edge 304 of the outer cylindrical portion of the piston crown 110 and an outer periphery 306 of the crown surface 202, and occupies a height in an axial direction along the centerline of the piston crown.

As indicated above, FIG. 3 is provided as an example. Other examples may differ from what was described in connection with FIG. 3.

INDUSTRIAL APPLICABILITY

The present disclosure is not only applicable to internal combustion engines having reciprocating pistons, as described relative to the implementations illustrated herein, but also to other types of applications, such as gas turbines, industrial burners, and/or the like. In general, the various indents can be formed in a structure that fuel will impinge upon when injected by an injector into a combustion chamber. The indents, and the redirection and segregation of fuel jets and plumes that the indents provide, are effective in promoting faster and more uniform mixing of fuel and air in the combustion chambers of engines, and inhibit the entrainment of recirculated combustion products from downstream regions into upstream regions of a fuel jet injected into the combustion chamber.

Figure 4:
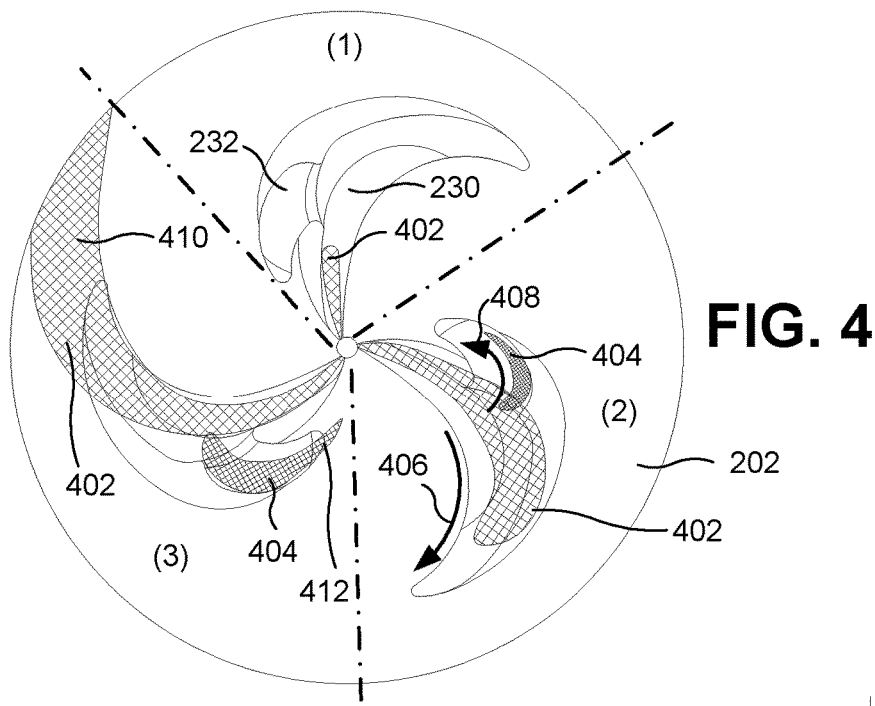
FIG. 4 is a diagram of a schematic view of an example top surface of a piston during various times in operation.

FIG. 4 shows a time-lapse representation of the engagement and redirection of a fuel jet 118 in an indent 208 is shown for three time instances, all of which are represented together for illustration. The piston 112 shown in FIG. 4 is segmented into three areas, a first area, denoted by "(1)," a second area, denoted by "(2)," and a third area, denoted by "(3)." While shown on a single piston 112, each of the first through third areas represents a snapshot of the position and distribution of a fuel jet 118 in different instances of time, and also represents a different position of the piston 112 in the cylinder bore 102, beginning at about −5 degrees after top dead center (dATDC), which can also be expressed as 5 degrees before top dead center (dBTDC), to about 30 dATDC. The distribution and interaction of the fuel jet 118 with the indent 208 may change depending on the fuel injection timing of a particular engine application and combustion system.

Referring to FIG. 4, at the initiation of a fuel injection at a first position of the piston 112 within the cylinder bore 102 (shown in area (1)), a fuel jet 118 is provided at the entrance of an indent 208 (e.g., at a first arcuate indent portion 230) and forms a first stream 402.

At a second position of the piston 112 within the cylinder bore 102 (shown as area (2)), which occurs moments after the first position, the first stream 402 has contacted the recirculation surface 218 and begins to spread into a wider region of contact as fuel from the first stream 402 is redirected by contacting the recirculation surface. At the same time (e.g., at the second position), a second stream 404 may be formed when the fuel jet 118 and/or the first stream 402 contacts and/or enters the second arcuate indent portion 232 (e.g., at a break in the wall 222). The fuel in the first stream 402 may be redirected upwards and away from the piston face, in a first direction 406 (e.g., a first reentrant direction), shown as a clockwise direction. This may create an inward motion of the fuel plume, created from the first stream 402, that overhangs the trailing portion of the first stream 402. The fuel in the second stream 404 may also be directed upwards and away from the piston face, in a second direction 408 (e.g., a second reentrant direction), shown as a counter-clockwise direction. This may create an inward motion of the fuel plume, created from the second stream 404, that overhangs the trailing portion of the second stream 404.

The first stream 402, formed from the fuel jet 118, continues to move, and a radial component of the velocity or momentum of the first stream 402 may cause the fuel to follow a surface of the first arcuate indent portion 230 as a first redirected jet moves in a radially outward and spiral path. Similarly, the second stream 404, formed from the fuel jet 118, continues to move, and a radial component of the velocity or momentum of the second stream 404 causes the fuel to follow a surface of the second arcuate indent portion 232 as a second redirected jet moves in a radially outward and spiral path in an opposite direction from the first stream 402.

At the third position, the first stream 402 reaches an end of the first arcuate indent portion 230, and momentum carries the first stream 402 away from the piston 112 to form a first plume 410 that is directed in an upward direction away from the piston 112 (e.g., a direction away from the piston face and towards the interior portion of the combustion chamber while the jet is already burning or is about to begin burning). Because of the shape of the redirected jet feeding the plume creation, the plume tends to concentrate in one direction that does not immediately infringe or stray in a direction of a neighboring plume created by a first arcuate indent portion 230 of an adjacent indent 208.

Similarly, the second stream 404 reaches an end of the second arcuate indent portion 232, and momentum carries the second stream 404 away from the piston 112 to form a second plume 412 that is directed in an upward direction away from the piston 112. Because of the shape of the redirected jet feeding the plume creation, the plume tends to concentrate in one direction that does not immediately infringe or stray in a direction of a neighboring plume created by a first arcuate indent portion 230 of an adjacent indent 208. In this way, the various plumes are segregated as the fuel jets 118 are redirected in opposite directions in each indent 208 to permit better fuel/air mixing in the combustion chamber.

Figure 5:
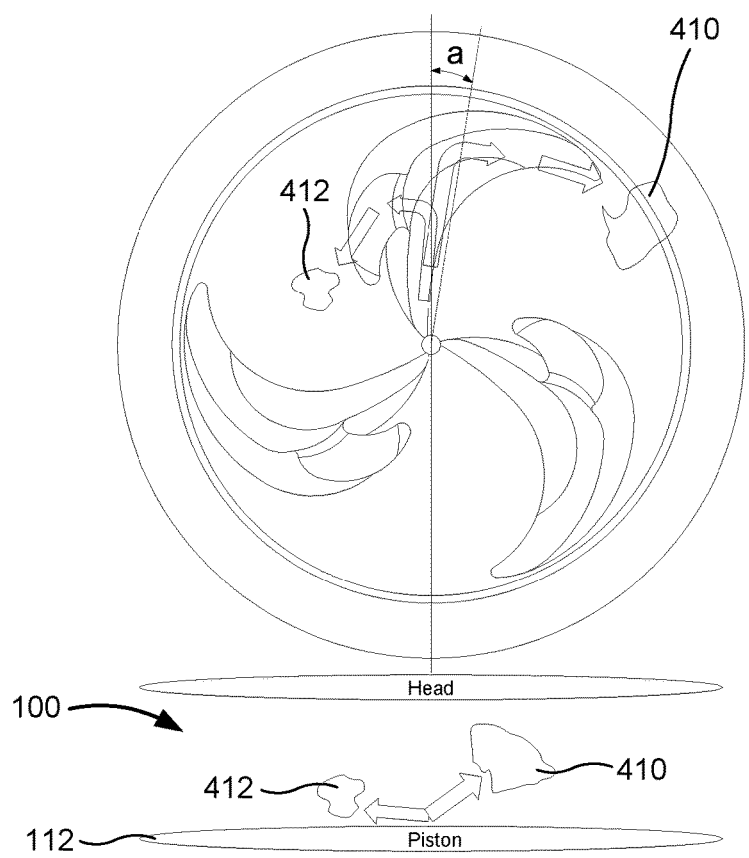
FIG. 5 is a diagram of a schematic view of an example top surface of a piston and a side view of an example piston during operation.

As shown in FIG. 5, in some implementations, the first plume 410 and the second plume 412 may exit their respective arcuate indent portions at different exit angles. This may cause the first plume 410 and the second plume 412 to settle at different heights above the piston 112 and/or different spatial locations, as shown. In this way, better fuel/air mixing in the combustion chamber 100 may be achieved.

In some implementations, the fuel jet 118 may be directed toward an indent 208 at an angle shown as "a." A majority of fuel in a fuel jet 118 (e.g., a larger portion of the fuel) may be redirected along the first arcuate indent portion 230, and a minority of the fuel in the fuel jet 118 (e.g., a smaller portion of the fuel) may be redirected along the second arcuate indent portion 232. In some implementations, the angle "a" of the fuel jet 118 may dictate the relative fuel distribution between the first stream 402 and the second stream 404.

In some implementations, the fuel injected into the combustion chamber 100 may be diesel fuel, and may be used in a dual fuel engine. For example, the dual fuel engine may use diesel fuel and natural gas. The natural gas may enter the combustion chamber 100 via one or more inlet passages 115, and the diesel fuel may be injected into the combustion chamber 100 via a fuel injector 114. Compression of the diesel fuel in the combustion chamber 100 (e.g., due to reciprocation of the piston 112 within the cylinder bore 102) may cause the diesel fuel to combust and ignite the natural gas in the combustion chamber 100. Using techniques and designs described herein, the diesel fuel may be distributed more quickly and/or more evenly throughout the combustion chamber 100 as compared to other techniques and designs, thereby permitting less diesel fuel to be used to achieve ignition of the natural gas. This may lower emissions, improve combustion, and/or the like.

Furthermore, the techniques and designs described herein may result in a longer path for the fuel jet 118 and/or a longer amount of time elapsing before fuel from the fuel jet 118 interacts with fuel from another fuel jet 118 injected into the combustion chamber 100. This promotes a better mixing of fuel and air, because the fuel jets 118 injected into the combustion chamber 100 cover more area as the fuel jets 118 are redirected by the first and second arcuate indent portions.

Furthermore, the reentrant feature 228 may reduce the amount of fuel that reaches a liner (e.g., of the cylinder bore 102) due to a swirl pattern. In this way, liner deposits and component temperatures may be reduced, and machine and/or component life may be extended.

As indicated above, FIGS. 4-5 are provided as examples. Other examples are possible and may differ from what was described in connection with FIGS. 4-5.

Figure 6:
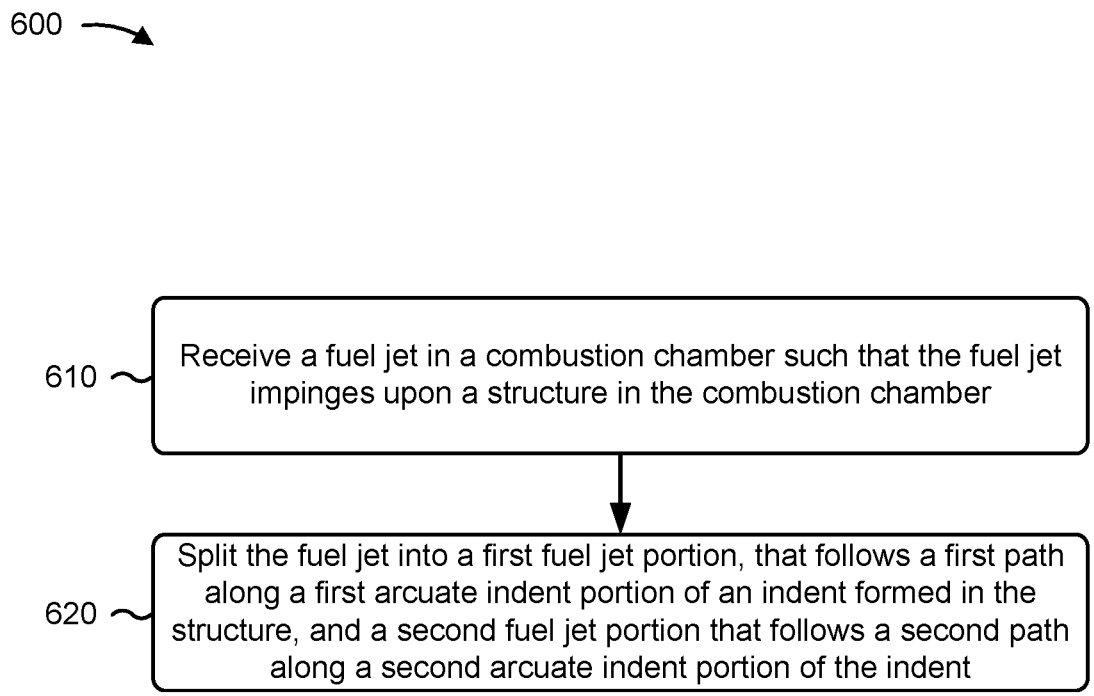
FIG. 6 is a flow chart of an example process for distributing fuel in a combustion chamber.

FIG. 6 is a flow chart of an example process 600 for distributing fuel in a combustion chamber. In some implementations, process 600 may be performed by or as a result of a design of one or more components of the engine 101, such as the piston crown 110, the piston 112, the fuel injector 114, the top surface 200, the indent 208, and/or the like.

As shown in FIG. 6, process 600 may include receiving a fuel jet in a combustion chamber such that the fuel jet impinges upon a structure in the combustion chamber (block 610). For example, a fuel jet may be injected into the combustion chamber by a fuel injector, and received in the combustion chamber due to such injection. The fuel jet may impinge upon a structure in the combustion chamber, such as a top surface of a crown portion of a piston.

As further shown in FIG. 6, process 600 may include splitting the fuel jet into a first fuel jet portion, that follows a first path along a first arcuate indent portion of an indent formed in the structure, and a second fuel jet portion that follows a second path along a second arcuate indent portion of the indent (block 620). For example, a single fuel jet may be split into a first fuel jet portion and a second fuel jet portion due to a shape of an indent formed in the structure upon which the single fuel jet impinges. The first fuel jet portion may follow (e.g., flow along) a first path along a first arcuate indent portion of the indent, and/or the second fuel jet portion may follow (e.g., flow along) a second path along a second arcuate indent portion of the indent.

Process 600 may include additional implementations, such as any single implementation or any combination of implementations described below and/or elsewhere herein.

In some implementations, the first arcuate indent portion curves in a first direction extending from a portion of the structure upon which the fuel jet impinges upon injection into the combustion chamber. In some implementations, the second arcuate indent portion curves in a second direction extending from a portion of the first arcuate indent portion. In some implementations, the first direction is a first spiral direction, and may be one of a clockwise direction or a counter-clockwise direction. Additionally, or alternatively, the second direction is a second spiral direction, and may be the other of the clockwise direction or the counter-clockwise direction. Additionally, or alternatively, the first spiral direction may be opposite from the second spiral direction. Additionally, or alternatively, the first arcuate indent portion may be larger than and/or longer than the second arcuate indent portion.

In some implementations, the first fuel jet portion exits the first arcuate indent portion at a first exit angle and the second fuel jet portion exits the second arcuate indent portion at a second exit angle that is different from the first exit angle. This may provide better fuel dispersion in the combustion chamber. For example, this may result in quickly achieving a wide or more even distribution of fuel in the combustion chamber, which may permit less fuel to be used, resulting in lower emissions, better combustion, lower operating temperatures, and/or the like. Additionally, or alternatively, the first fuel jet portion may include a larger amount of fuel than the second fuel jet portion.

In some implementations, a distribution of fuel, in the fuel jet, between the first fuel jet portion and the second fuel jet portion is based on an angle at which the fuel jet is injected into the combustion chamber. For example, the angle at which the fuel is injected may be adjusted to control an amount of fuel in the first fuel jet portion and/or the second fuel jet portion, thereby permitting flexible configurations based on requirements of an engine or other machine.

In some implementations, the indent is included in a plurality of indents formed in the structure. In some implementations, each of the plurality of indents includes: a respective first arcuate indent portion that extends from the portion of the structure upon which the fuel jet impinges, and a respective second arcuate indent portion that extends from a portion of the respective first arcuate indent portion. In some implementations, a number of the plurality of indents is equal to a number of fuel jets injected into the combustion chamber.

In some implementations, a reentrant feature overhangs and/or extends over the first arcuate indent portion (e.g., a wall of the first arcuate indent portion), and the second arcuate indent portion forms and/or extends from a break in the reentrant feature. In some implementations, the fuel jet includes a first type of fuel, and a second type of fuel is received in the combustion chamber via an intake valve. In some implementations, the first type of fuel is diesel fuel and the second type of fuel is natural gas.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations are possible in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of possible implementations. Although each dependent claim listed below may directly depend on only one claim, the disclosure of possible implementations includes each dependent claim in combination with every other claim in the claim set.

What is claimed is:

1. An internal combustion engine, comprising:
an engine block having at least one cylinder bore;
a cylinder head having a flame deck surface disposed at one end of the cylinder bore;
a piston connected to a rotatable crankshaft and configured to reciprocate within the cylinder bore, the piston having a crown portion facing the flame deck surface such that a combustion chamber is defined within the cylinder bore and between a top surface of the crown portion and the flame deck surface;

a fuel injector having a nozzle tip disposed in fluid communication with the combustion chamber, the nozzle tip having at least one nozzle opening configured to inject a fuel jet into the combustion chamber; and an indent formed in the top surface, the indent including a first arcuate indent portion that curves in a first spiral direction extending from a central portion of the piston and a second arcuate indent portion that curves in a second spiral direction;

the first arcuate indent portion including a wall that curves in the first spiral direction from the central portion to a break, and curves in the first spiral direction from the break; and the second arcuate indent portion connects to the first arcuate indent portion, and curves in the second spiral direction from the break back toward the central portion of the piston.

2. The internal combustion engine of claim 1, wherein, during operation, a single fuel jet provided into the indent is separated into:
a first fuel jet portion that follows a first path corresponding to the first arcuate indent portion, and
a second fuel jet portion that follows a second path corresponding to the second arcuate indent portion.

3. The internal combustion engine of claim 1, wherein the first spiral direction is one of a clockwise direction or a counter-clockwise direction, and wherein the second spiral direction is the other of the clockwise direction or the counter-clockwise direction.

4. The internal combustion engine of claim 1, wherein the first spiral direction is opposite from the second spiral direction.

5. The internal combustion engine of claim 1, wherein the indent is included in a plurality of indents formed in the top surface,
wherein each of the plurality of indents includes:
a respective first arcuate indent portion that curves in a first spiral direction extending from a central portion of the piston, and
a respective second arcuate indent portion that curves in a second spiral direction extending from a break in a wall of the respective first arcuate indent portion.

6. The internal combustion engine of claim 5, wherein a number of the plurality of indents is equal to a number of fuel jets injected into the combustion chamber by the fuel injector.

7. The internal combustion engine of claim 1, wherein a reentrant feature extends over the wall of the first arcuate indent portion, and wherein the second arcuate indent portion forms a break in the reentrant feature.

8. A component of a piston, comprising:
a crown portion configured to face a flame deck surface disposed at one end of a cylinder bore in which the piston is configured to reciprocate, such that a combustion chamber is defined within the cylinder bore and between a top surface of the crown portion and the flame deck surface; and
an indent formed in the top surface, the indent being aligned with a fuel jet centerline along which a fuel jet is to be injected into the combustion chamber, wherein the indent includes a first arcuate indent portion, that curves in a first direction from a center of the crown portion, and a second arcuate indent portion that curves in a second direction from a break in a reentrant feature that overhangs the first arcuate indent portion; and
the indent having an innermost point adjacent to a piston surface center, and an entry surface extending away from the piston surface center.

9. The component of claim 8, wherein, during operation, a single fuel jet provided into the indent is separated into:
a first stream that flows along the first arcuate indent portion, and
a second stream that flows along the second arcuate indent portion.

10. The component of claim 9, wherein the first stream includes a larger amount of fuel than the second stream.

11. The component of claim 8, wherein the first arcuate indent portion is larger than the second arcuate indent portion.

12. The component of claim 8, wherein the second arcuate indent portion is one of multiple second arcuate indent portions included in the indent and extending from multiple respective breaks in the reentrant feature.

13. The component of claim 8, wherein the crown portion includes a sloping outer surface configured to form a space between a periphery of the top surface and an inner surface of the cylinder bore.

14. The component of claim 8, wherein the first arcuate indent portion has a first exit angle that is different from a second exit angle of the second arcuate indent portion.

15. A method for distributing fuel in a combustion chamber, comprising:
receiving a fuel jet in the combustion chamber such that the fuel jet impinges upon a top surface of a piston in the combustion chamber; and
splitting, as a result of the impingement, the fuel jet into a first fuel jet portion that follows a first path along a first arcuate indent portion of an indent formed in the top surface, and a second fuel jet portion that follows a second path along a second arcuate indent portion of the indent,
wherein the first arcuate indent portion curves in a first direction extending from a portion of the top surface upon which the fuel jet impinges upon reception into the combustion chamber, and
wherein the second arcuate indent portion curves in a second direction extending from a portion of the first arcuate indent portion.

16. The method of claim 15, wherein the first fuel jet portion exits the first arcuate indent portion at a first exit angle and the second fuel jet portion exits the second arcuate indent portion at a second exit angle that is different from the first exit angle.

17. The method of claim 15, wherein a distribution of fuel, in the fuel jet, between the first fuel jet portion and the second fuel jet portion is based on an angle at which the fuel jet is injected into the combustion chamber.

18. The method of claim 15, wherein the indent is included in a plurality of indents formed in the top surface,
wherein each of the plurality of indents includes:
a respective first arcuate indent portion that extends from the portion of the top surface upon which the fuel jet impinges, and
a respective second arcuate indent portion that extends from a portion of the respective first arcuate indent portion.

19. The method of claim 15, wherein the fuel jet includes a first type of fuel, and wherein a second type of fuel is received in the combustion chamber via an intake valve.

20. The method of claim 19, wherein the first type of fuel is diesel fuel and the second type of fuel is natural gas.

21. The method of claim 15, wherein the first fuel jet portion exits the first arcuate indent portion at a first rotational direction relative to a center of the combustion chamber and the second fuel jet portion exits the second arcuate indent portion at a second rotational direction relative to the center of the combustion chamber that is different from the first rotational direction.

\* \* \* \* \*